(12) United States Patent
Yamagami et al.

(10) Patent No.: US 10,567,632 B2
(45) Date of Patent: Feb. 18, 2020

(54) NON-TRANSITORY COMPUTER-READABLE STORAGE MEDIUM, IMAGE PROCESSING METHOD, AND IMAGE PROCESSING APPARATUS

(71) Applicant: FUJITSU LIMITED, Kawasaki-shi, Kanagawa (JP)

(72) Inventors: Hiroshi Yamagami, Yokohama (JP); Hideyuki Kikuchi, Chigasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/121,687

(22) Filed: Sep. 5, 2018

(65) Prior Publication Data

US 2019/0075228 A1  Mar. 7, 2019

(30) Foreign Application Priority Data

Sep. 7, 2017 (JP) ................................ 2017-172101

(51) Int. Cl.
*H04N 5/76* (2006.01)
*H04N 5/232* (2006.01)
*H04N 5/235* (2006.01)
*G06T 7/00* (2017.01)

(52) U.S. Cl.
CPC ........... *H04N 5/232* (2013.01); *G06T 7/0004* (2013.01); *H04N 5/2353* (2013.01); *G06T 2207/10016* (2013.01); *G06T 2207/30184* (2013.01)

(58) Field of Classification Search
CPC ........... H04N 5/23218; H04N 5/23222; H04N 5/23229; G06T 7/0004; G06T 7/62; G06T 7/90; G06T 7/0012; G06T 7/00; G06T 7/10; G06T 2207/30108; G01B 11/022
See application file for complete search history.

(56) References Cited

U.S. PATENT DOCUMENTS

| 4,947,447 A | 8/1990 | Miyaoka et al. | |
|---|---|---|---|
| 2007/0237385 A1* | 10/2007 | Kato | G01N 21/9501 382/149 |
| 2015/0195475 A1* | 7/2015 | Matsui | H04N 5/44 348/552 |
| 2018/0159469 A1* | 6/2018 | Trupke | H02S 50/15 |
| 2019/0035067 A1* | 1/2019 | Yamamoto | H04N 21/4335 |
| 2019/0197679 A1* | 6/2019 | Fang | G06N 5/046 |

FOREIGN PATENT DOCUMENTS

| JP | 62-281582 | 12/1987 |
|---|---|---|
| JP | 2005-136594 | 5/2005 |
| WO | WO-2019130391 A1 * | 7/2019 |

* cited by examiner

*Primary Examiner* — Kelly L Jerabek
(74) *Attorney, Agent, or Firm* — Fujitsu Patent Center (57) ABSTRACT

A non-transitory computer-readable storage medium storing a program that causes a computer to execute a process, the process including identifying a damaged part of a structure included in a captured image by analyzing the captured image, specifying a first partial area including the damaged part in the captured image, and specifying a second partial area corresponding to the partial area in each of a plurality of past captured images captured before the captured image, and generating a plurality of compressed images corresponding to the plurality of past captured images by compressing an image area in each of the plurality of past captured images without compressing the second partial area.

8 Claims, 13 Drawing Sheets

| IDENTIFICATION NUMBER | LOCATION INFORMATION | TIME INFORMATION | IMAGE DATA |
|---|---|---|---|
| 10a | IMAGE CAPTURING LOCATION OF IMAGE DATA OF IDENTIFICATION NUMBER "10a" | IMAGE CAPTURING TIME OF IMAGE DATA OF IDENTIFICATION NUMBER "10a" | IMAGE DATA OF IDENTIFICATION NUMBER "10a" |
| 11a | IMAGE CAPTURING LOCATION OF IMAGE DATA OF IDENTIFICATION NUMBER "11a" | IMAGE CAPTURING TIME OF IMAGE DATA OF IDENTIFICATION NUMBER "11a" | IMAGE DATA OF IDENTIFICATION NUMBER "11a" |
| 12a | IMAGE CAPTURING LOCATION OF IMAGE DATA OF IDENTIFICATION NUMBER "12a" | IMAGE CAPTURING TIME OF IMAGE DATA OF IDENTIFICATION NUMBER "12a" | IMAGE DATA OF IDENTIFICATION NUMBER "12a" |
| 13a | IMAGE CAPTURING LOCATION OF IMAGE DATA OF IDENTIFICATION NUMBER "13a" | IMAGE CAPTURING TIME OF IMAGE DATA OF IDENTIFICATION NUMBER "13a" | IMAGE DATA OF IDENTIFICATION NUMBER "13a" |
| ... | ... | ... | ... |

| IDENTIFICATION NUMBER | LOCATION INFORMATION | TIME INFORMATION | VECTOR DATA |
|---|---|---|---|
| 10b | IMAGE CAPTURING LOCATION OF VECTOR DATA OF IDENTIFICATION NUMBER "10b" | IMAGE CAPTURING TIME OF VECTOR DATA OF IDENTIFICATION NUMBER "10b" | VECTOR DATA OF IDENTIFICATION NUMBER "10b" (DAMAGE LOCATION INFORMATION) |
| 11b | IMAGE CAPTURING LOCATION OF VECTOR DATA OF IDENTIFICATION NUMBER "11b" | IMAGE CAPTURING TIME OF VECTOR DATA OF IDENTIFICATION NUMBER "11b" | VECTOR DATA OF IDENTIFICATION NUMBER "11b" (DAMAGE LOCATION INFORMATION) |
| 12b | IMAGE CAPTURING LOCATION OF VECTOR DATA OF IDENTIFICATION NUMBER "12b" | IMAGE CAPTURING TIME OF VECTOR DATA OF IDENTIFICATION NUMBER "12b" | VECTOR DATA OF IDENTIFICATION NUMBER "12b" (DAMAGE LOCATION INFORMATION) |
| 13b | IMAGE CAPTURING LOCATION OF VECTOR DATA OF IDENTIFICATION NUMBER "13b" | IMAGE CAPTURING TIME OF VECTOR DATA OF IDENTIFICATION NUMBER "13b" | VECTOR DATA OF IDENTIFICATION NUMBER "13b" (DAMAGE LOCATION INFORMATION) |
| ... | ... | ... | ... |

| ADDRESS INFORMATION | PRESENCE OF DAMAGE |
|---|---|
| (1,1) | true |
| (1,2) | true |
| (1,3) | true |
| ... | ... |
| (5,5) | false |
| (5,6) | false |
| (5,7) | false |
| ... | ... |

FIG. 12 his application is based upon and claims the benefit of priority of the prior Japanese Patent Application No. 2017-172101, filed on Sep. 7, 2017, the entire contents of which are incorporated herein by reference.

NON-TRANSITORY COMPUTER-READABLE STORAGE MEDIUM, IMAGE PROCESSING METHOD, AND IMAGE PROCESSING APPARATUS

CROSS-REFERENCE TO RELATED APPLICATION

This application is based upon and claims the benefit of priority of the prior Japanese Patent Application No. 2017-172101, filed on Sep. 7, 2017, the entire contents of which are incorporated herein by reference.

FIELD

The embodiments discussed herein are related to a non-transitory computer-readable storage medium, an image processing method, and an image processing apparatus.

BACKGROUND

To maintain infrastructure such as structures, inspections are made and when problems are found, the problematic portions are repaired. When such work is performed, labor and expenses are not sufficient in many cases. To solve the problem, some methods employ Information and Communication Technology (ICT).

Such solutions that use ICT include techniques for capturing images of structures with image sensors, drones, robots, and the like to increase inspection efficiency and accuracy. For example, Japanese Laid-open Patent Publication No. 62-281582 discusses a technique for storing image data obtained by using a measuring vehicle or a sensor in a database and analyzing the image data stored in the database to detect a problem and estimate deterioration from aging for efficient structure inspection. In order to accurately detect a problem in a structure, it is preferable that high-resolution image data be used.

In this technique, to store image data in a database, a storage having an adequate storage capacity is to be provided, and thus the storage cost is increased. In order to store a large amount of data, for example, a technique discussed in Japanese Laid-Open Patent Publication No. 2005-136594 distributes and stores data in a plurality of devices.

In the above-described known techniques, however, image data compression is not effectively performed.

For example, in order to reduce merely the data capacity of image data, the image data may be compressed; however, compressing the image data may decrease the quality of the image data and the accuracy for detecting a problem in a structure.

SUMMARY

According to an aspect of the invention, a non-transitory computer-readable storage medium storing a program that causes a computer to execute a process, the process including identifying a damaged part of a structure included in a captured image by analyzing the captured image, specifying a first partial area including the damaged part in the captured image, and specifying a second partial area corresponding to the partial area in each of a plurality of past captured images captured before the captured image, and generating a plurality of compressed images corresponding to the plurality of past captured images by compressing an image area in each of the plurality of past captured images without compressing the second partial area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of an image processing program, an image processing method, and an image processing apparatus will be described in detail with reference to the attached drawings. It is to be understood that the disclosure is not limited to these embodiments.

Figure 1:
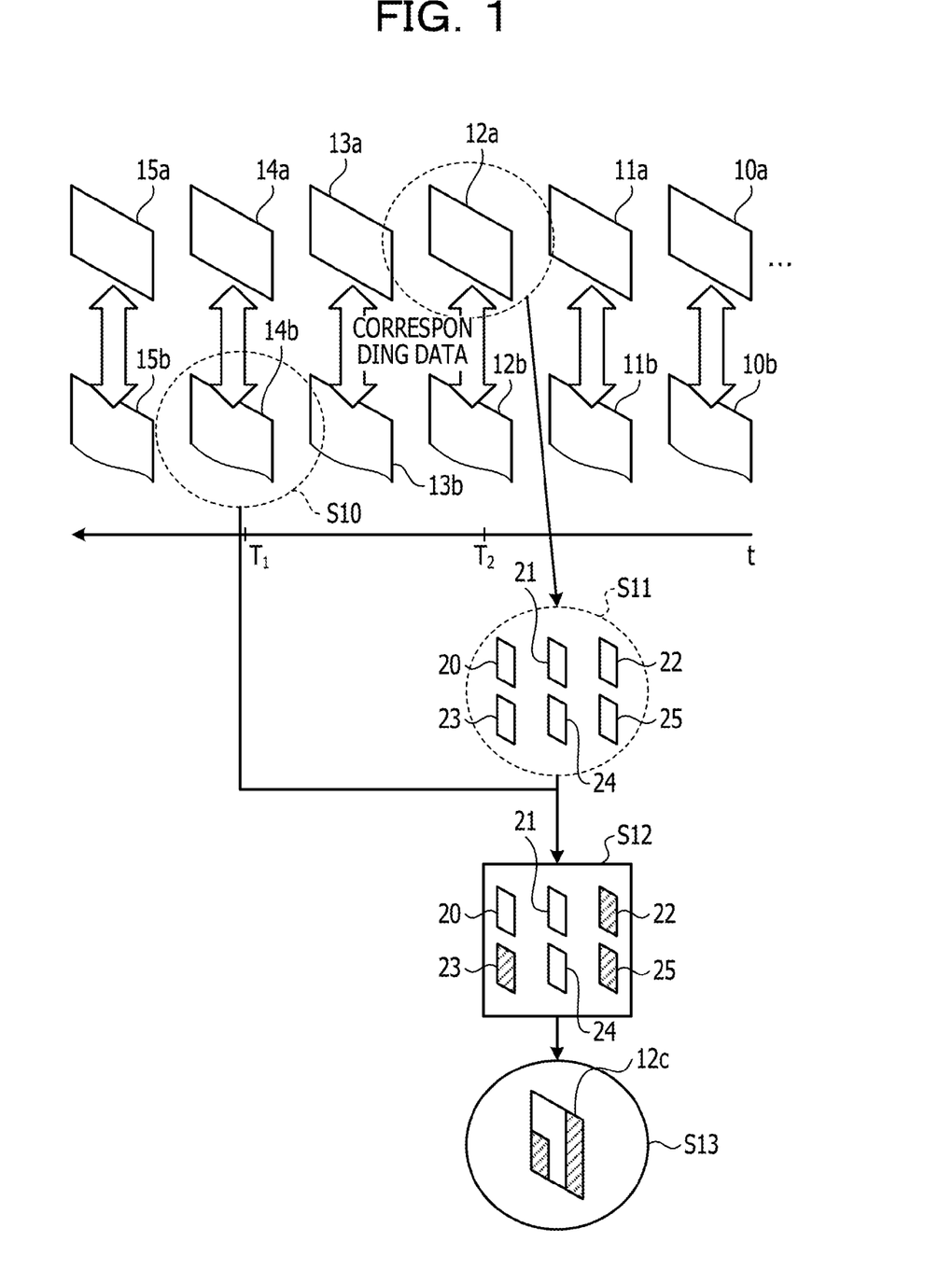
FIG. 1 illustrates example processing performed in an image processing apparatus according to an embodiment.

FIG. 1 illustrates example processing performed in an image processing apparatus according to an embodiment. A camera (not illustrated) captures images of a target structure to generate image data 10*a* to 15*a*. When the image data 10*a* to 15*a* are arranged in order of image capturing, the image data are arranged in the order of the image data 10*a*, 11*a*, 12*a*, 13*a*, 14*a*, and 15*a*. Vector data (relational data) 10*b* to 15*b* correspond to image data 10*a* to 15*a* respectively. It is assumed that the image data 10*a* to 15*a* and the vector data (relational data) 10*b* to 15*b* represent images of the same location captured at different times. For example, image data 10*a* and vector data 10*b* of a certain location are captured, and several years later, image data 11*a* and 11*b* of the same location are acquired.

For example, the image processing apparatus may copy and analyze images of the image data 10*a* to 15*a* to generate vector data 10*b* to 15*b*. Alternatively, the vector data 10*b* to 15*b* may be image data captured by a second camera that is different from the first camera that captured the image data 10*a* to 15*a*. In such a case, a user refers to the image data captured by the first camera and the vector data captured by the second camera and associates the image data with the vector data. The vector data 10*b* to 15*b* are not limited to images, and alternatively, may be data that indicates information of a location of damage. For example, information of a location of damage acquired by a device such as a physical quantity sensor may be generated as vector data 10b to 15b. If there is a "crack", the line of the crack is the vector data.

Here, example processing performed by using image data 12a and vector data 14b by the image processing apparatus will be described. It is assumed that an image capturing time of the image data 12a is $T_2$, and an image capturing time of image data 14a that corresponds to the vector data 14b is $T_1$. The image capturing time $T_2$ is a time earlier than the image capturing time $T_1$.

The image processing apparatus analyzes the vector data 14b and identifies a significant part such as a damaged part (step S10). For example, the image processing apparatus divides the image data 12a into a plurality of partial images 20 to 25 (step S11).

The image processing apparatus specifies the partial images that do not include the coordinates of the significant part that has been identified in step S10 from the partial images 20 to 25 and compresses the specified partial images (step S12). For example, the image processing apparatus compresses the partial images 22, 23, and 25.

The image processing apparatus combines the compressed partial images 22, 23, and 25 and the uncompressed partial images 20, 21, and 24 to generate image data 12c of an original image format (step S13). The image processing apparatus stores the image data 12c instead of the image data 12a in a database.

As described above, the image processing apparatus identifies a significant part from image data that was captured at a certain time, compresses parts other than the part corresponding to the significant part in image data that was captured at a time earlier than the certain time, and stores the data in a database. Consequently, a part where damage (significant part) may occur in the future is not compressed and the other parts are compressed, and thus the amount of the image data can be reduced while reducing the risk of lowering the accuracy in detecting problems.

Figure 2:
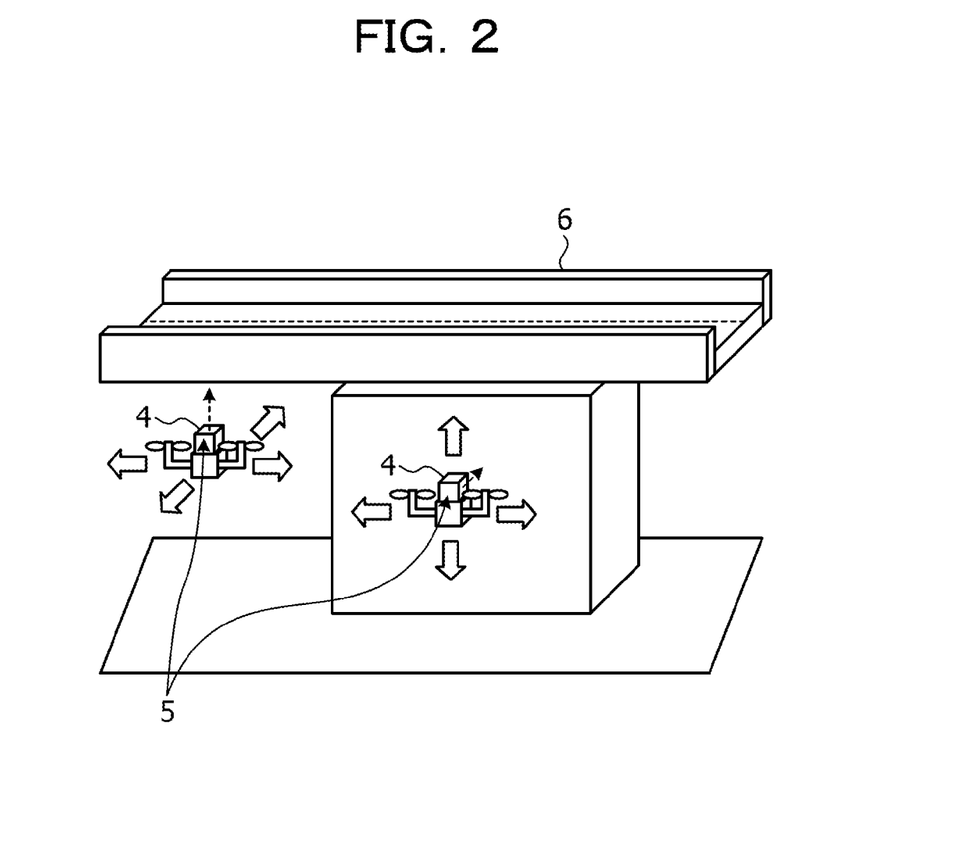
FIG. 2 illustrates an image capturing scene.

FIG. 2 illustrates an image capturing scene. For example, a camera 4 is attached to a drone 5 and the drone 5 is moved to sequentially capture images of a structure 6 in a predetermined period. In FIG. 2, as an example, two drones 5 are used to capture images of the structure 6; however, three or more drones 5 may be used to capture images or a single drone 5 may be used to capture images. The data of images captured by the cameras 4 of the drones 5 are stored in a storage unit, which will be described below, in the image processing apparatus. In capturing an image, the camera 4 adds location information that uniquely indicates the image capturing location to the image data. In FIG. 2, the camera 4 is attached to the drone 5 to capture images; however, other devices may be used. For example, images may be captured by using a high-resolution telecamera installed on the ground.

Figure 3:
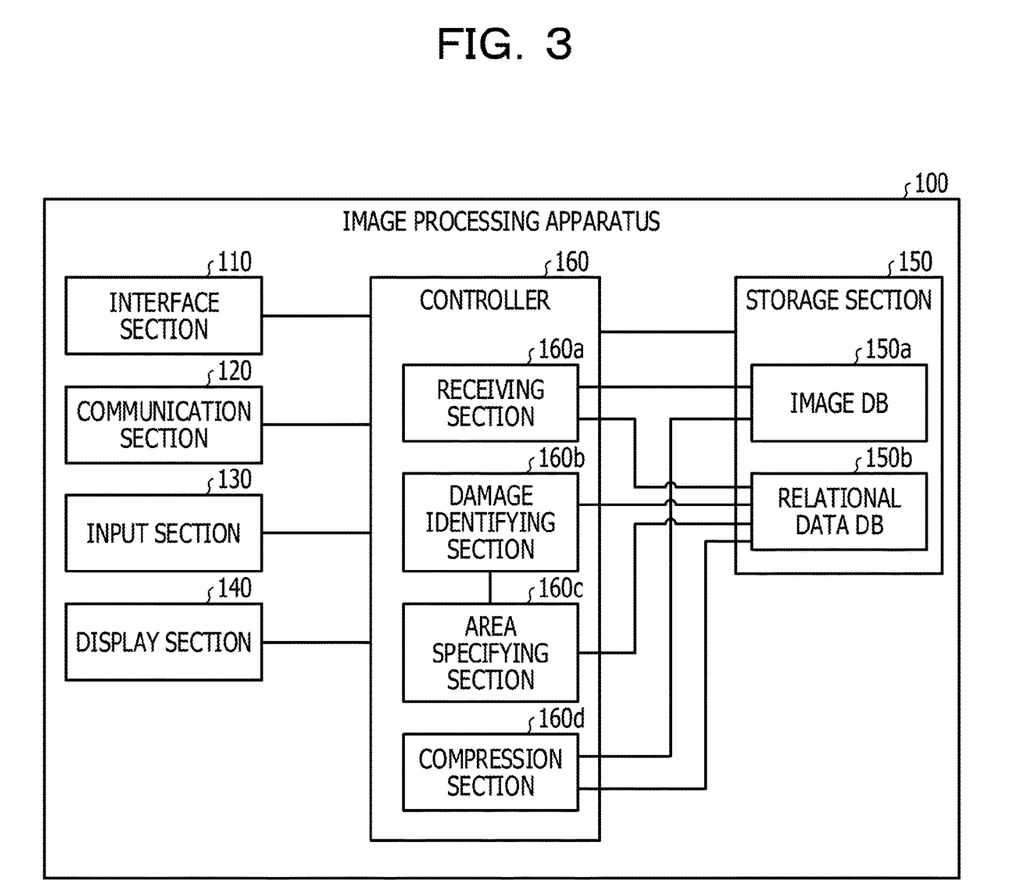
FIG. 3 is a functional block diagram illustrating a configuration of an image processing apparatus according to an embodiment.

FIG. 3 is a functional block diagram illustrating a configuration of an image processing apparatus according to the embodiment. As illustrated in FIG. 3, the image processing apparatus 100 includes an interface section 110, a communication section 120, an input section 130, a display section 140, a storage section 150, and a controller 160.

The interface section 110 is connected to an interface of the camera 4 and acquires image data captured by the camera 4. The controller 160, which will be described below, exchanges data with the camera 4 via the interface section 110.

The communication section 120 performs data communication with an external device (not illustrated) via a network. The controller 160 exchanges data with an external device via the communication section 120. The controller 160 may be connected to the camera 4 via a network to acquire image data.

The input section 130 is an input device for inputting various kinds of information to the image processing apparatus 100. For example, the input section 130 may be a keyboard, a mouse, or a touch panel.

The display section 140 is a display device for displaying information output from the controller 160. For example, the display section 140 may be a liquid crystal display or a touch panel.

The storage section 150 includes an image database (DB) 150a and a relational data DB 150b. The storage section 150 may be a semiconductor memory device such as a random access memory (RAM), a read-only memory (ROM), or a flash memory or a storage device such as a hard disk drive (HDD).

Figure 4:
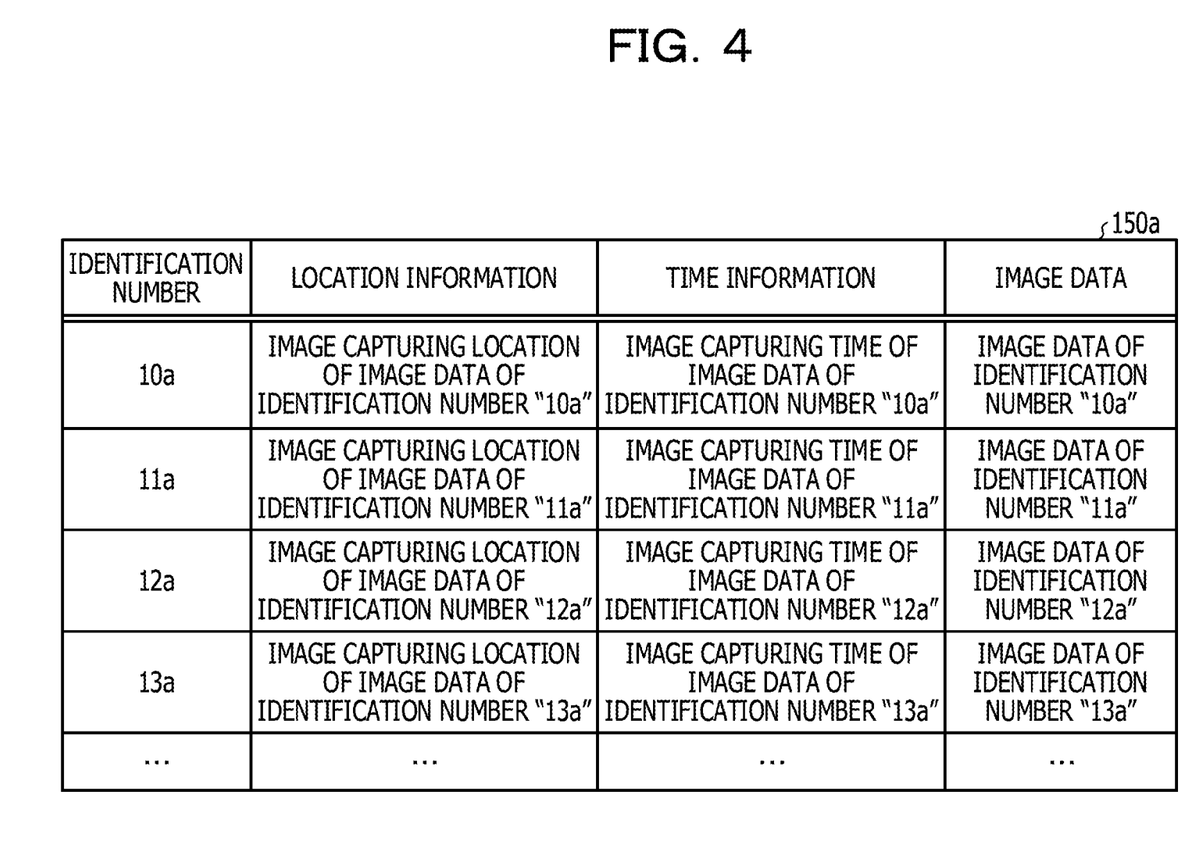
FIG. 4 illustrates a data structure of an image database (DB)

The image DB 150a is a database that stores information about image data. FIG. 4 illustrates a data structure of the image DB. As illustrated in FIG. 4, the image DB 150a associates an identification number with location information, time information, and image data. The identification number uniquely identifies image data. The location information indicates an image capturing location of image data. The time information indicates an image capturing time of image data. The image data is data of an image captured by the camera 4 at a corresponding image capturing location and a corresponding image capturing time.

Figure 5:
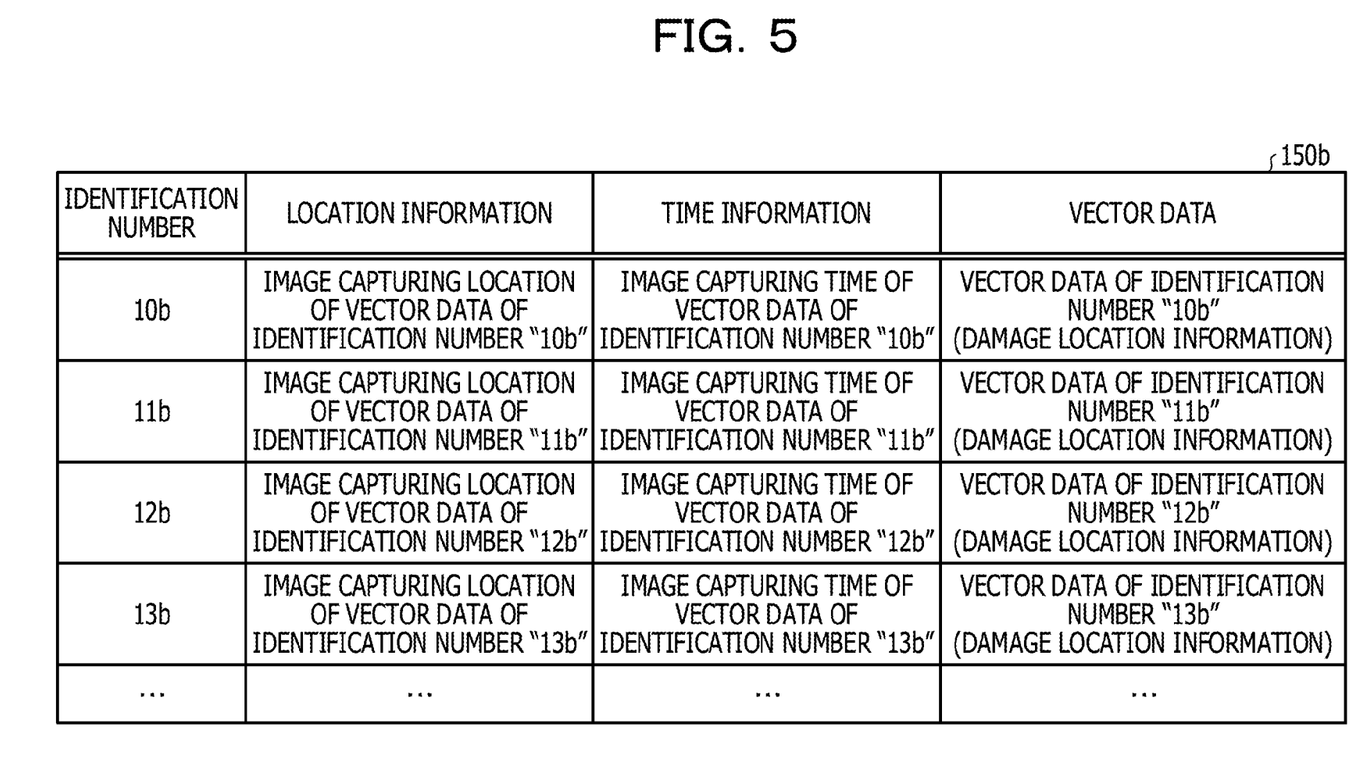
FIG. 5 illustrates a data structure of a relational data DB.

The relational data DB 150b is a database that stores information about vector data. FIG. 5 illustrates a data structure of the relational data DB. As illustrated in FIG. 5, the relational data DB 150b associates an identification number with location information, time information, and vector data. The identification number uniquely identifies vector data. The location information indicates an image capturing location of vector data. The time information indicates an image capturing time of vector data. The vector data represents an image captured by the camera 4 at a corresponding image capturing location and a corresponding image capturing time, and corresponds to damage location information, which will be described below.

For example, vector data 10b indicates an area of the same size as the area of the captured image data 10a and is associated with the location information of the image data. The address information of the associated image data 10a is associated with the address information of the damage location information of the vector data 10b. The address information indicates a location of a cell (partial image) that is obtained by dividing the vector data 10b into a predetermined size. Other vector data and image data are similarly associated with each other.

Figure 6:
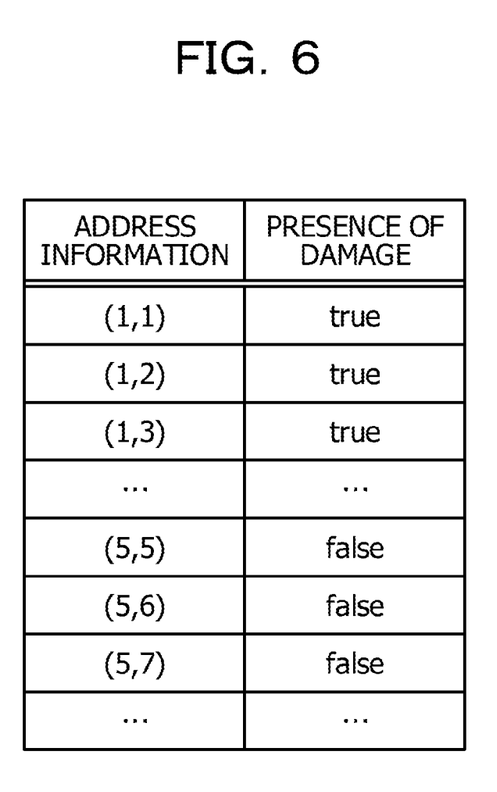
FIG. 6 illustrates a data structure of damage location information.

FIG. 6 illustrates a data structure of damage location information. As illustrated in FIG. 6, in the damage location information, the address information is associated with the presence of damage. The address information uniquely indicates a location of a cell that is obtained by dividing vector data into a predetermined size. The presence of damage indicates whether there is a damaged part in a cell corresponding to the address information. If there is no damaged part in the cell, the presence of damage indicates "true". If there is a damaged part in the cell, the presence of damage indicates "false".

Returning to the description of FIG. 3, the controller 160 includes a receiving section 160a, a damage identifying section 160*b*, an area specifying section 160*c*, and a compression section 160*d*. The controller 160 may be implemented by a central processing unit (CPU), a micro processing unit (MPU), or the like. The controller 160 may also be implemented by hard wired logic such as an application-specific integrated circuit (ASIC) or a field-programmable gate array (FPGA).

The receiving section 160*a* acquires information about image data via the interface section 110 or the communication section 120, and stores the acquired information about the image data in the image DB 150*a*. The receiving section 160*a* acquires information about vector data via the interface section 110 or the communication section 120, and stores the acquired information about the vector data in the relational data DB 150*b*. The damage location information included in the relational data DB 150*b* is set to an initial value. For example, the receiving section 160*a* sets the presence of damage corresponding to all address information of the damage location information to "false" to initialize the damage location information.

The damage identifying section 160*b* receives a specification of time $T_1$ as a damage analysis target, acquires vector data that corresponds to the time $T_1$ from the relational data DB 150*b*, analyzes the acquired vector data, and identifies a damaged part.

Figure 7:
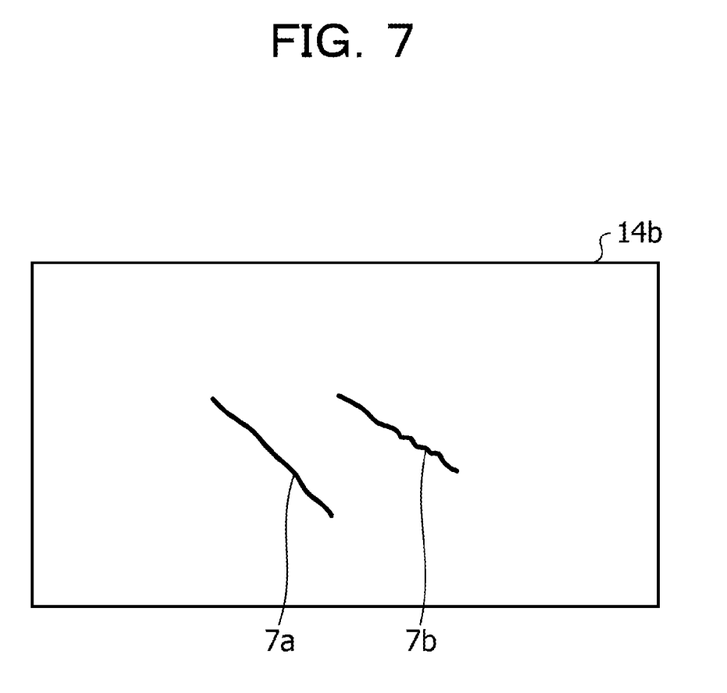
FIG. 7 illustrates the processing performed in a damage locating section.

FIG. 7 illustrates the processing performed in the damage identifying section. For example, it is assumed that vector data that corresponds to the time $T_1$ is the vector data 14*b*. The damage identifying section 160*b* performs binary processing, edge extraction processing and the like on the vector data 14*b*, and identifies an edge part that corresponds to a predetermined feature of a damaged part such as a crack or the like as a damaged part. In the example in FIG. 7, the damage identifying section 160*b* identifies damaged parts 7*a* and 7*b*. The damage identifying section 160*b* outputs the information of the identified damaged parts to the area specifying section 160*c*.

Figure 8:
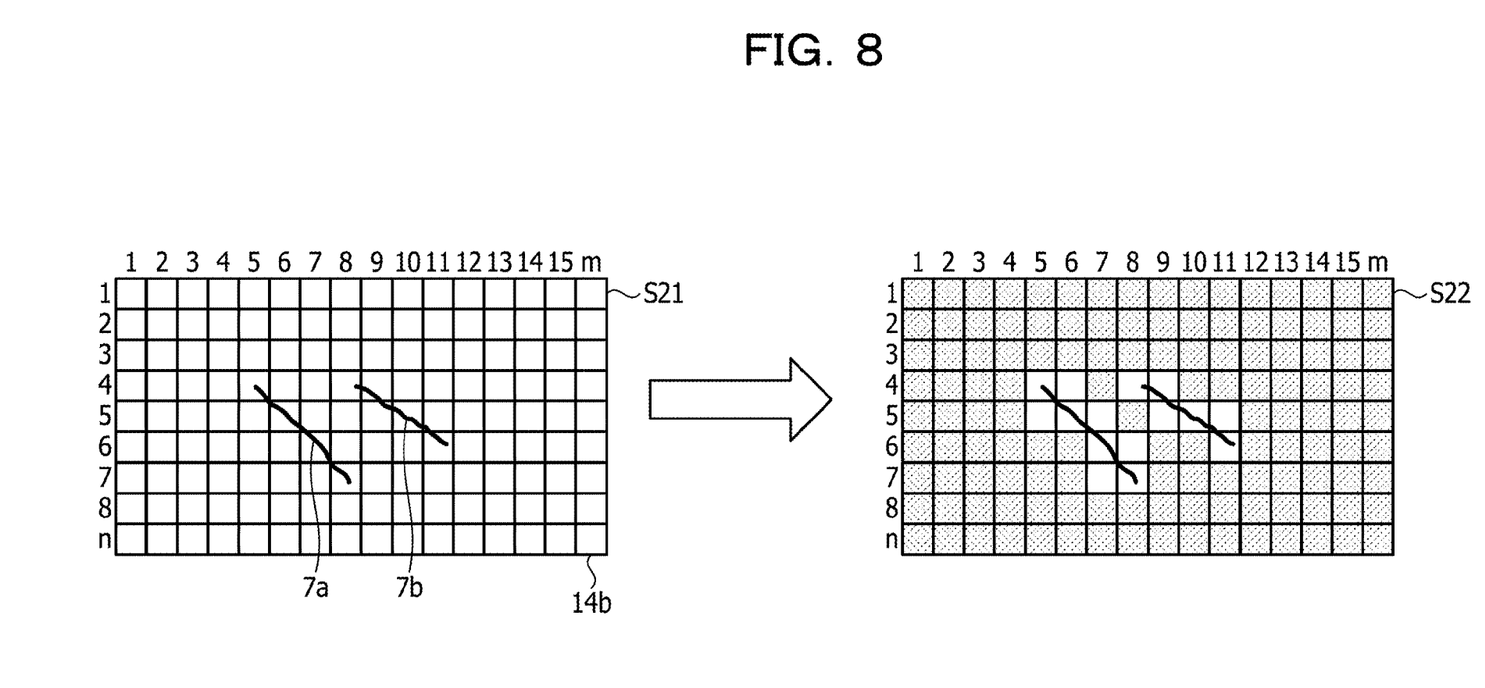
FIG. 8 illustrates the processing performed in an area specifying section.

The area specifying section 160*c* divides the vector data into a plurality of cells, compares the information of the damaged parts from the damage identifying section 160*b* with the divided cells, and specifies a cell that includes a damaged part. The area specifying section 160*c* refers to the relational data DB 150*b* and updates the damage location information of the corresponding vector data. The area specifying section 160*c* sets the presence of damage corresponding to the address information of the cell that includes the damaged part to "false". The area specifying section 160*c* sets the presence of damage corresponding to the address information of the cell that includes no damaged part to "true".

FIG. 8 illustrates the processing performed in the area specifying section. As illustrated in FIG. 8, the area specifying section 160*c* divides the vector data 14*b* into n×m cells (step S21). In this example, n=9 and m=16.

The area specifying section 160*c* compares each cell with the damaged parts 7*a* and 7*b* and classifies the cells into cells that include the damaged parts and cells that include no damaged parts (step S22). For example, cells corresponding to the address information (4, 5), (4, 6), (4, 8), (4, 9), (5, 5), (5, 6), (5, 7), (5, 9), (5, 10), and (5, 11) are classified as cells that include the damaged parts. Similarly, cells corresponding to the address information (6, 7), (6, 8), (6, 11), (7, 7), and (7, 8) are classified as the cells that include the damaged parts. The other cells are classified as cells that include no damaged parts.

Figure 9:
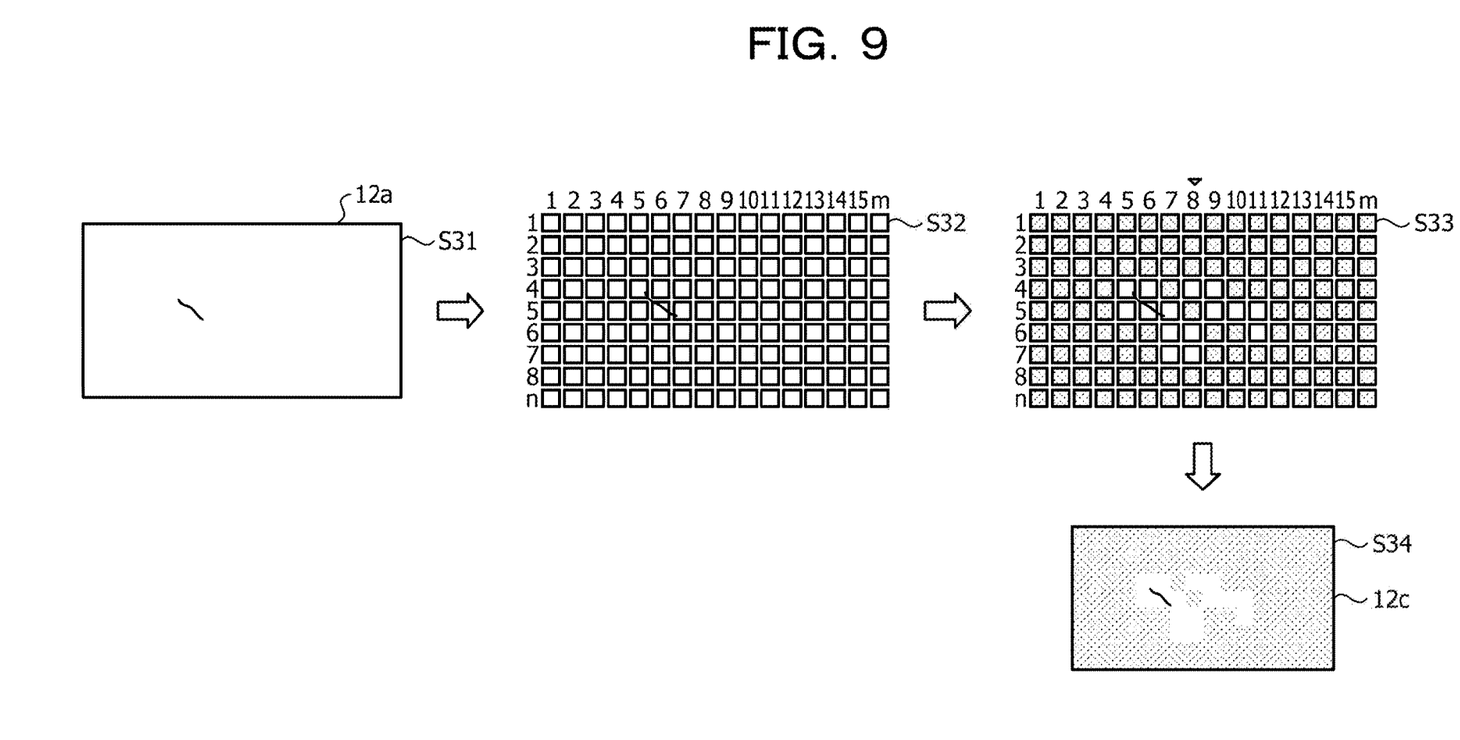
FIG. 9 illustrates the processing performed in a compression section.

The compression section 160*d* divides image data of the image DB 150*b* into a plurality of partial images and among the divided partial images, compresses the partial images other than the partial images in which damaged parts appear after a predetermined time. The compression section 160*d* determines the partial images in which damaged parts appear after a predetermined time based on the damage location information of vector data (image capturing time: time $T_1$) that was captured after the image data (image capturing time: time $T_2$) to be compressed was captured.

FIG. 9 illustrates the processing performed in the compression section. For example, the compression section 160*d* acquires the image data 12*a* that was captured at the time $T_2$ from the image DB 150*a* (step S31). The compression section 160*d* divides the image data 12*a* into n×m partial images (step S32). In this example, n=9 and m=16.

The compression section 160*d* refers to the damage location information that has been associated with the time $T_1$ and determines partial images to be compressed and partial images not to be compressed. The compression section 160*d* determines partial images that correspond to the address information that corresponds to the presence of damage "true" to be partial images to be compressed. The compression section 160*d* determines partial images that correspond to the address information that corresponds to the presence of damage "false" to be partial images not to be compressed.

For example, in the example illustrated in FIG. 8, the presence of damage is "false" with respect to the information corresponding to the address information (4, 5), (4, 6), (4, 8), (4, 9), (5, 5), (5, 6), (5, 7), (5, 9), (5, 10), and (5, 11). Similarly, the presence of damage is "false" with respect to the information corresponding to the address information (6, 7), (6, 8), (6, 11), (7, 7), and (7, 8). The presence of damage is "true" with respect to the information corresponding to the other address information.

In this case, the compression section 160*d* determines that among the partial images (1, 1) to (9, 16), the partial images that correspond to the address information (4, 5), (4, 6), (4, 8), (4, 9), (5, 5), (5, 6), (5, 7), (5, 9), (5, 10), and (5, 11) are partial images not to be compressed. The compression section 160*d* determines that the partial images that correspond to the address information (6, 7), (6, 8), (6, 11), (7, 7), and (7, 8) are partial images not to be compressed. The compression section 160*d* determines that the rest of the partial images to be partial image to be compressed (step S33).

The compression section 160*d* compresses the partial images to be compressed and leaves the partial images not to be compressed without performing any processing on them. The compression section 160*d* combines the compressed partial images and the partial images that are not compressed based on the address information to generate image data 12*c* (step S34). For example, the data format of the image data 12*c* is the same format as that of the image data 12*a*. The compression section 160*d* overwrites the image data 12*a* that has been stored in the relational data DB 150*b* with the image data 12*c*. The compression section 160*d* repeats the above-described processing on the other image data.

Figure 10:
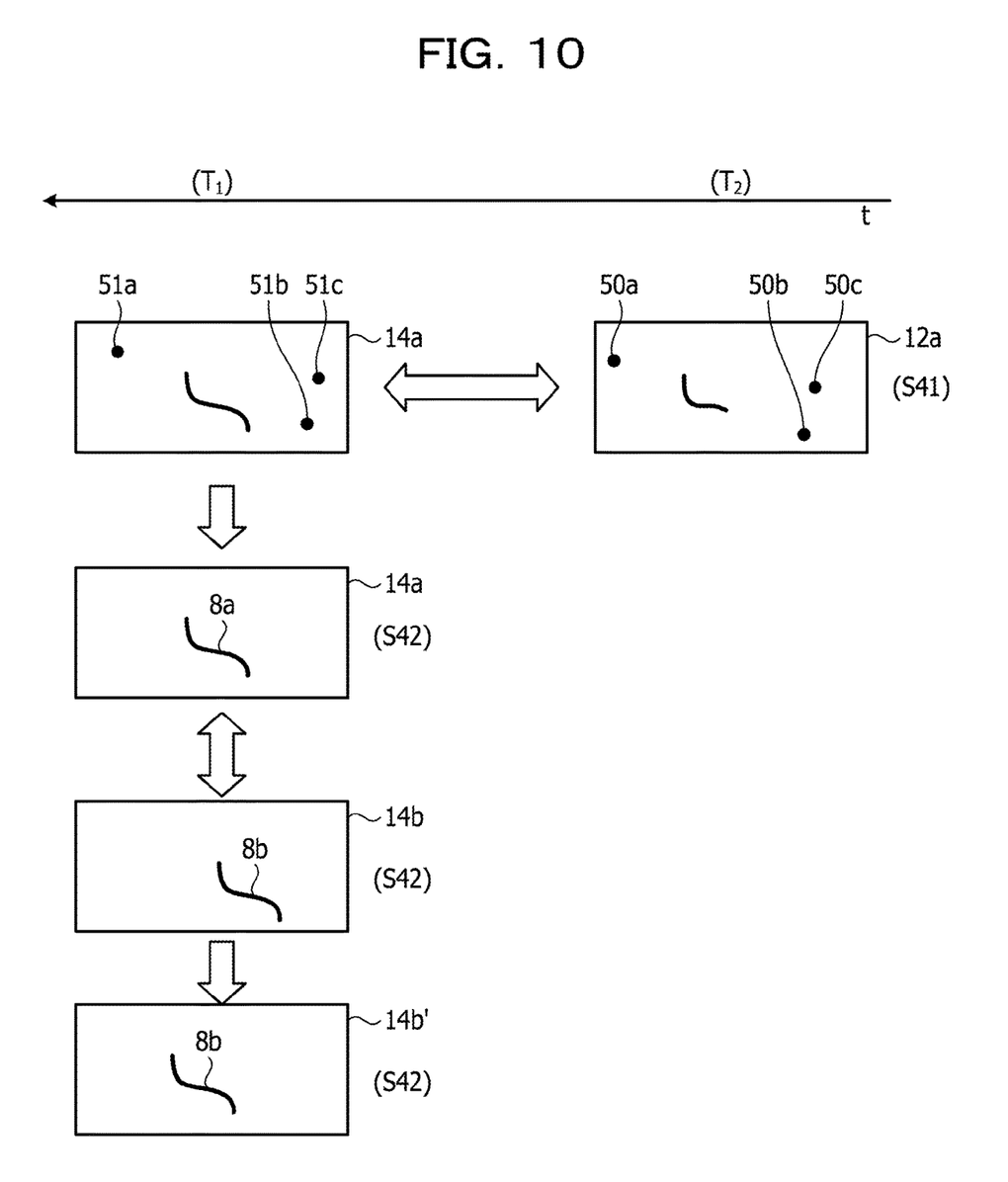
FIG. 10 illustrates the processing of calculating position correction parameters.

If there is a misalignment among the image data of the same area, or there is a misalignment between corresponding image data and vector data, partial images to be compressed and partial images not to be compressed are not appropriately determined. To solve the problem, for example, the damage identifying section 160*b* may calculate position correction parameters P1 and P2, which will be described below, and correct the positions of the damaged parts of the vector data by using the calculated position correction parameters P1 and P2. By using the vector data in which the damaged parts have been corrected, the above-described area specifying section 160c determines cells that include damaged parts, and the compression section 160d determines a partial area to be compressed and a partial area not to be compressed.

FIG. 10 illustrates the processing of calculating the position correction parameters. For example, the image data 12a in FIG. 10 is image data captured at the time $T_2$. The image data 14a is image data captured at the time $T_1$. The vector data 14b is relational data that corresponds to the image data 14a.

The damage identifying section 160b acquires the image data 12a and the image data 14a from the image DB 150a. The damage identifying section 160b analyzes the image data 12a and detects feature points 50a, 50b, and 50c. The damage identifying section 160b analyzes the image data 14a and detects feature points 51a, 51b, and 51c. The damage identifying section 160b calculates a position correction parameter P1 by the equation (1) (step S41).

$$P1 = \text{the average position of the entire feature points } 51a, 51b, \text{ and } 51c - \text{the average position of the feature points } 50a, 50b, \text{ and } 50c \quad (1)$$

In the example in step S41 in FIG. 10, in the equation (1), the feature point 50a corresponds to the feature point 51a, the feature point 50b corresponds to the feature point 51b, and the feature point 50c corresponds to the feature point 51c. The damage identifying section 160b selects feature points close to each other as corresponding feature points. In the equation (1), the number of feature points is the number of feature points extracted from a single piece of image data. For example, in step S41 in FIG. 10, the number of feature points is "3".

Then, the damage identifying section 160b performs image analysis on the image data 14a and extracts a damaged part 8a (step S42). The damage identifying section 160b performs image analysis on the vector data 14b and extracts a damaged part 8b. The damage identifying section 160b compares the damaged part 8a with the damaged part 8b and calculates a position correction parameter P2. For example, the damage identifying section 160b calculates the position correction parameter P2 by the equation (2).

$$P2 = \text{the average position of the entire damaged part } 8a - \text{the average position of the entire damaged part } 8b \quad (2)$$

The damage identifying section 160b corrects the position of the damaged part 8b of the vector data 14b based on the position correction parameters P1 and P2 and generates vector data 14b'. For example, the damage identifying section 160b moves the position of the damaged part 8b by the amount of "P1+P2" to correct the position of the damaged part 8b.

Figure 11:
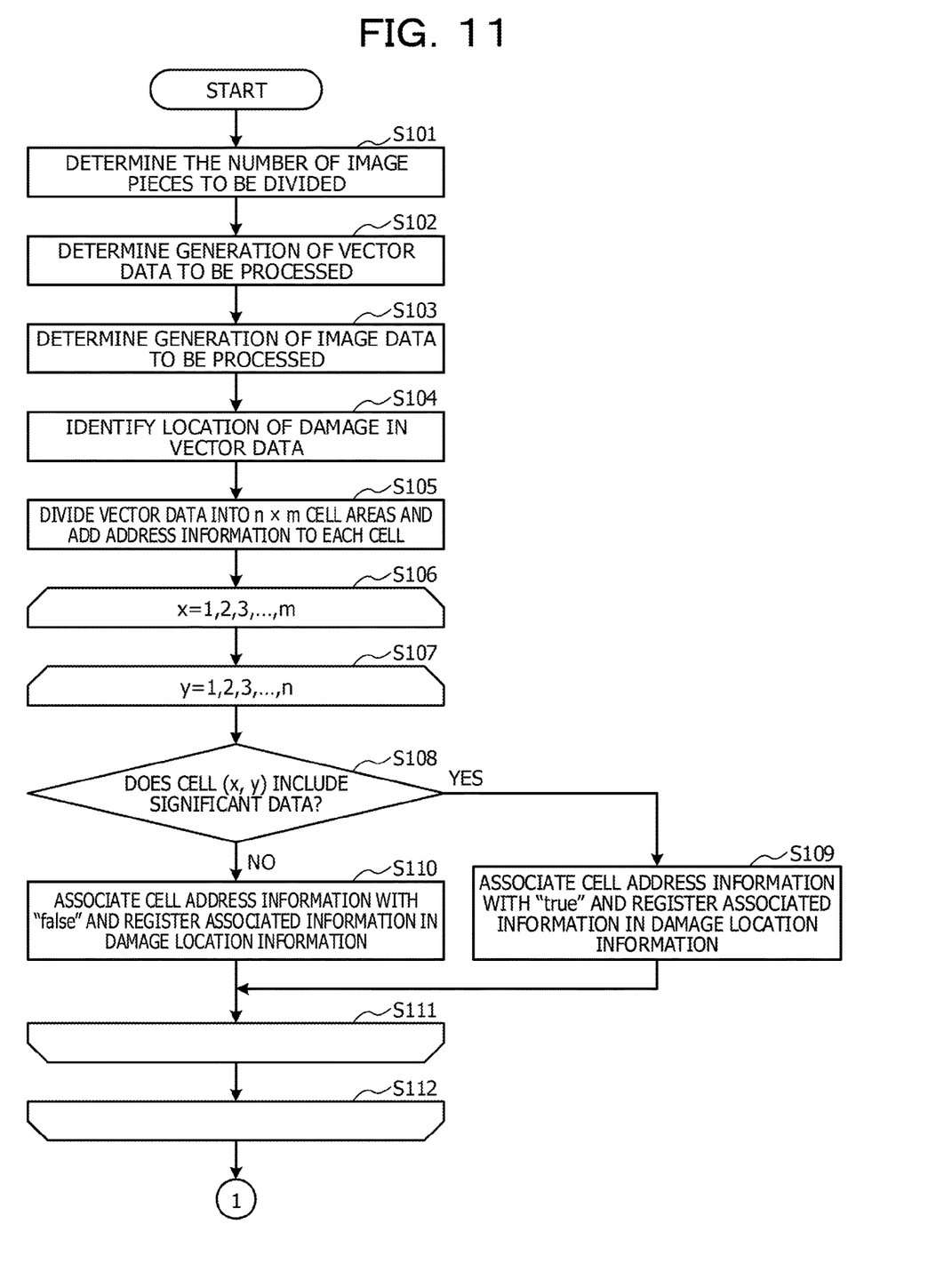
FIG. 11 is a flowchart of the processing performed in an image processing apparatus according to an embodiment.
Figure 12:
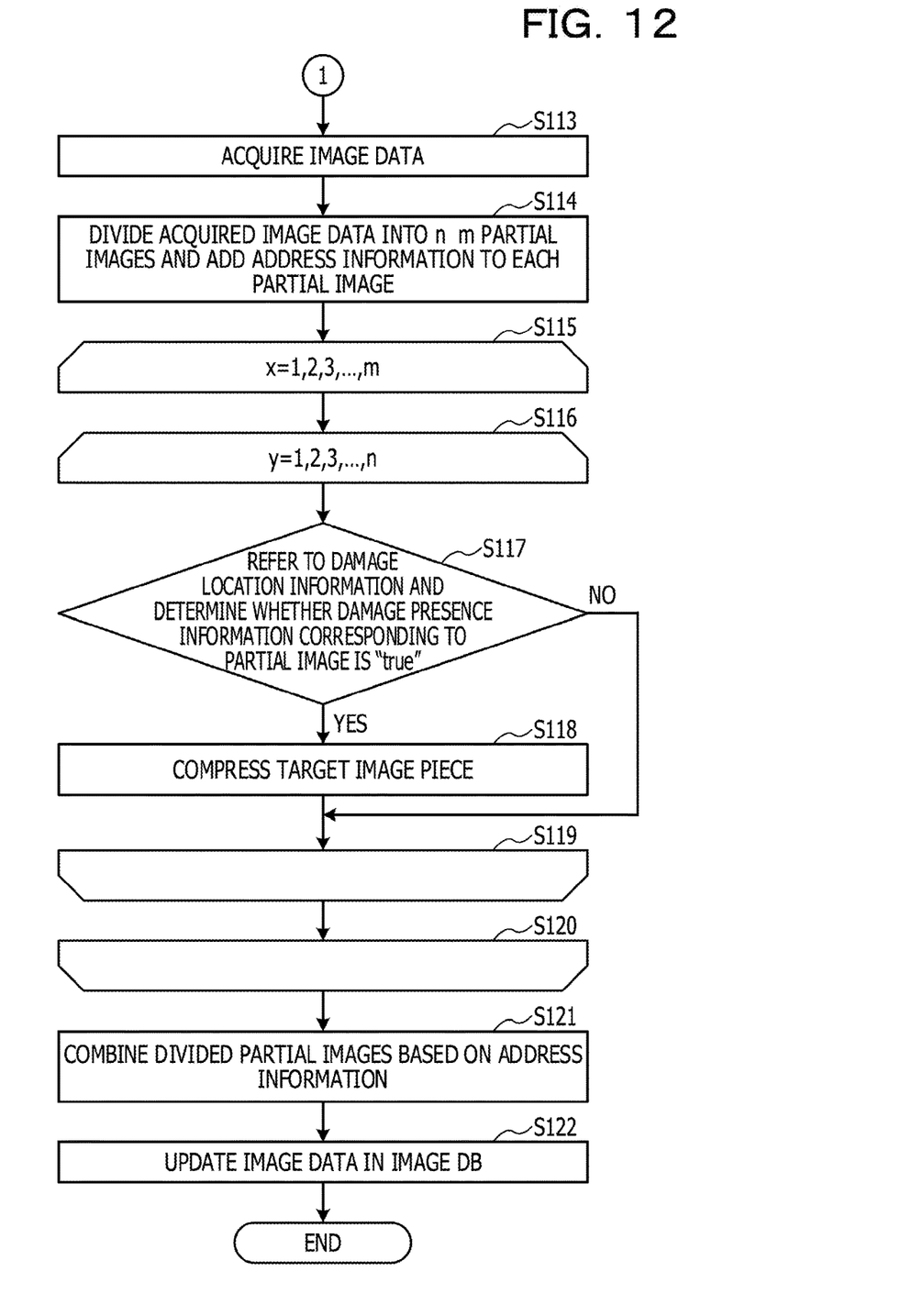
FIG. 12 is a flowchart 2 of the processing performed in an image processing apparatus according to an embodiment.

Hereinafter, example processing performed by the image processing apparatus 100 according to the embodiment will be described. FIG. 11 and FIG. 12 are a flowchart illustrating the processing performed in the image processing apparatus according to the embodiment. As illustrated in FIG. 11, the image processing apparatus 100 receives a definition of the number of divided screens (n×m) (step S101). The image processing apparatus 100 defines a vector-data processing target generation (step S102). The image processing apparatus 100 defines an image-data processing target generation (step S103). In the example described in FIG. 1, the vector-data processing target generation is the vector data 14b, and the image-data processing target generation is the image data 12a. However, various definitions of the vector-data processing target generation and the image-data processing target generation may be employed. For example, the image processing apparatus 100 may select vector data that was most recently captured by the camera 4 as a vector-data processing target generation, and define image data that was captured a predetermined time earlier than the time of the selected data as an image-data processing target generation.

The damage identifying section 160b in the image processing apparatus 100 identifies a damaged part in the vector data (step S104). The area specifying section 160c in the image processing apparatus 100 divides the vector data into n×m cell areas and adds the address information to each cell (step S105). The image processing apparatus 100 repeats the processing of steps S106 to step S112 until the value of x becomes m while incrementing the value of x in order from 1, and then the processing proceeds to step S113 in FIG. 12. The image processing apparatus 100 repeats the processing from step S107 to step S111 until the value of y becomes n while incrementing the value of y in order from 1, and then the processing proceeds to step S112.

The area specifying section 160c in the image processing apparatus 100 determines whether the cell (x, y) includes significant data (damaged part) (step S108). If the area specifying section 160c determines that the cell (x, y) includes significant data (step S108, Yes), the processing proceeds to step S109. The area specifying section 160c associates the address information of the cell with "true" and stores the associated information in the damage location information. Then, the processing proceeds to step S111 (step S109).

If the area specifying section 160c determines that the cell (x, y) includes no significant data (step S108, No), the processing proceeds to step S110. The area specifying section 160c associates the address information of the cell with "false" and stores the associated information in the damage location information. Then, the processing proceeds to step S111 (step S110).

The processing in FIG. 12 will be described. The compression section 160d in the image processing apparatus 100 acquires image data to be processed (step S113). The compression section 160d divides the acquired image data into n×m partial images and adds the address information to the respective partial images (step S114).

The image processing apparatus 100 repeats the processing from step S115 to step S120 until the value of x becomes m while incrementing the value of x in order from 1, and then the processing proceeds to step S121. The image processing apparatus 100 repeats the processing from step S116 to step S119 until the value of y becomes n while incrementing the value of y in order from 1, and then the processing proceeds to step S120.

The compression section 160d refers to the damage location information and determines whether the presence of damage that corresponds to the address information corresponding to the partial image is "true" (step S117). If the presence of damage that corresponds to the address information corresponding to the partial image is "true" (step S117, Yes), the compression section 160d compresses the partial image (step S118). Then, the processing proceeds to step S119.

If the presence of damage that corresponds to the address information corresponding to the partial image is not "true" (step S117, No), the processing proceeds to step S119. The compression section 160d combines the divided partial images based on the address information (step S121). The compression section 160d updates the image data in the image DB 150a (step S122).

Hereinafter, advantages of the image processing apparatus 100 according to the embodiment will be described. The image processing apparatus 100 identifies a significant part in image data that was captured at a certain time, compresses areas other than the area corresponding to the significant part in image data that was captured at a time earlier than the certain time, and stores the data in a database. Consequently, an area where damage (significant part) may occur in the future is not compressed and the other areas are compressed, and thus the amount of the image data can be effectively reduced. For example, the amount of image data can be reduced while the risk of lowering the accuracy in detecting problems is reduced. Furthermore, the image processing apparatus 100 effectively compresses image data while leaving a significant part for the purpose of the capturing of the image data.

The image processing apparatus 100 combines compressed partial images and uncompressed partial images to generate image data of the original image format and overwrites corresponding image data in the image DB 150a by using the generated image data. By this processing, the amount of image data can be reduced.

The image processing apparatus 100, in a predetermined time, divides sequentially captured vector data of a structure into a plurality of cells, and in a specified captured image included in the vector data captured in the predetermined time, identifies a feature area from each divided cell as a damaged part. Consequently, whether a damaged part presents or not is determined for each cell, and the information can be effectively associated with partial images to be compressed.

The image processing apparatus 100 compresses image data, in a plurality of pieces of vector data captured in a predetermined time, based on the vector data captured last and image data captured at a predetermined time earlier than the time the vector data was captured. Consequently, a period in which image data is not being compressed can be reduced.

Figure 13:
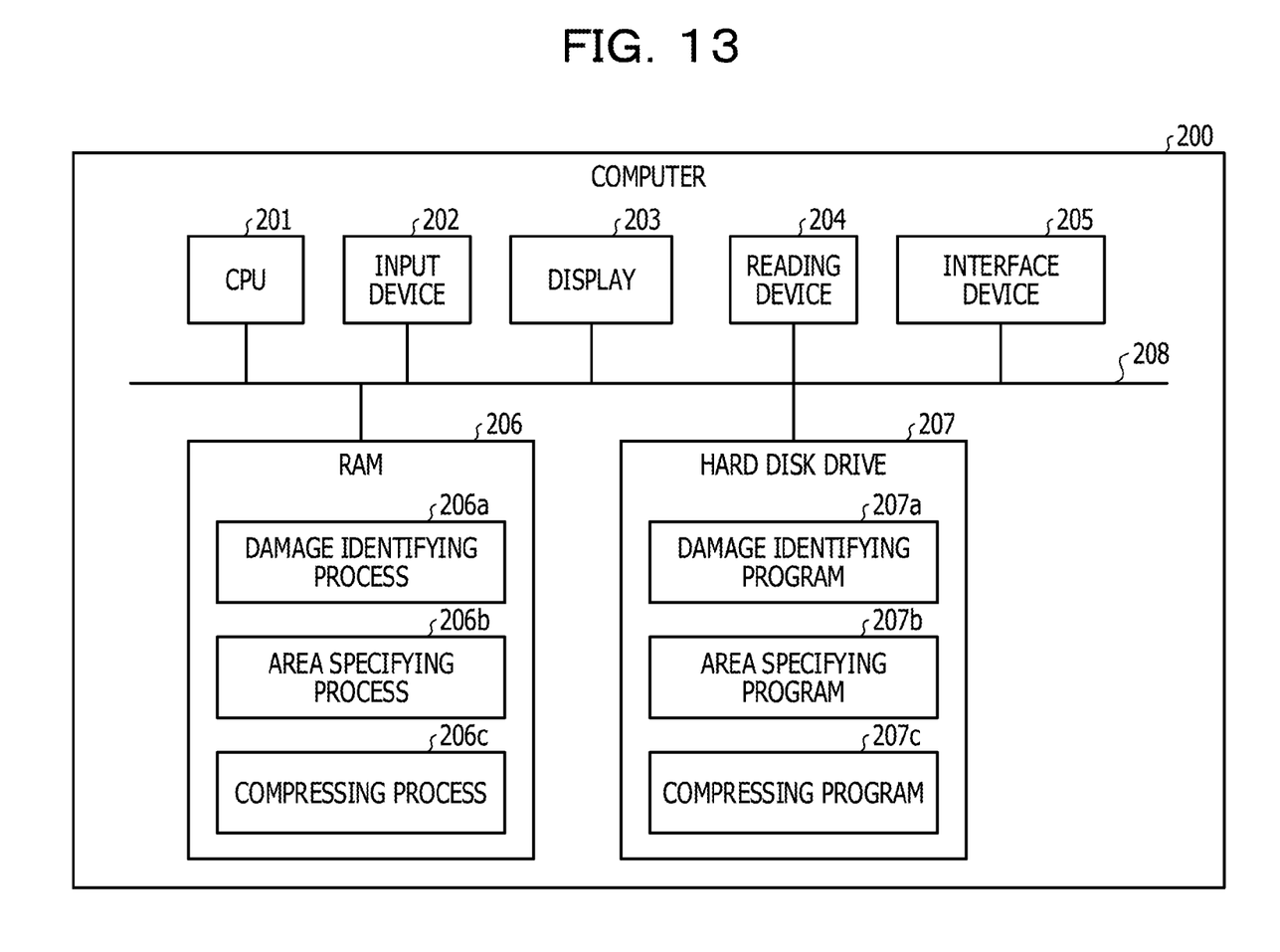
FIG. 13 illustrates a hardware configuration of a computer that implements functions similar to those in an image processing apparatus.

Hereinafter, a hardware configuration of a computer that implements functions similar to those in the image processing apparatus 100 according to the above-described embodiment will be described. FIG. 13 illustrates a hardware configuration of a computer that implements functions similar to those in the image processing apparatus.

As illustrated in FIG. 13, a computer 200 includes a CPU 201 that executes various calculation processes, an input device 202 that receives an input of data from a user, and a display 203. The computer 200 also includes a reading device 204 that reads a program, or the like from a storage medium and an interface device 205 that exchanges data with another computer via a network. The computer 200 also includes a RAM 206 that temporarily stores various kinds of information and a hard disk device 207. The devices 201 to 207 are connected to a bus 208.

The hard disk device 207 includes a damage identifying program 207a, an area specifying program 207b, and a compression program 207c. The CPU 201 reads the damage identifying program 207a, the area specifying program 207b, and the compression program 207c and loads the programs in the RAM 206.

The damage identifying program 207a functions as a damage identifying process 206a. The area specifying program 207b functions as an area specifying process 206b. The compression program 207c functions as a compression process 206c. The processing of the damage identifying process 206a corresponds to the processing in the damage identifying section 160b. The processing of the area specifying process 206b corresponds to the processing in the area specifying section 160c. The processing of the compression process 206c corresponds to the processing in the compression section 160d.

The programs 207a to 207c may not be stored in the hard disk device 207 in advance. For example, each program may be stored in a "portable physical medium" such as a flexible disk (FD), a compact disc read-only memory (CD-ROM), a digital versatile disc (DVD), a magneto-optical disk, or an integrated circuit (IC) card. Each of the programs 207a to 207c may be read and executed by the computer 200.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
   identifying a damaged part of a structure included in a captured image by analyzing the captured image;
   specifying a first partial area including the damaged part in the captured image; and
   specifying a second partial area corresponding to the partial area in each of a plurality of past captured images captured before the captured image; and
   generating a plurality of compressed images corresponding to the plurality of past captured images by compressing an image area in each of the plurality of past captured images without compressing the second partial area.

2. The non-transitory computer-readable storage medium according to claim 1, wherein the process further comprises:
   overwriting the plurality of past captured images stored in a storage device with the plurality of compressed images.

3. The non-transitory computer-readable storage medium according to claim 1, wherein
   the identifying the damaged part includes:
      dividing the captured image into a plurality of image areas of a predetermined size; and
      determining an image area, in the plurality of image areas, having a specified image feature to be the damaged part.

4. The non-transitory computer-readable storage medium according to claim 3, wherein the identifying the damaged part further includes:
   extracting the image area having the specified image feature based on vector data of the captured image.

5. The non-transitory computer-readable storage medium according to claim 1, wherein
   the captured image and the plurality of past captured images are images captured within a predetermined period; and wherein
   the captured image is an image captured last in the images captured within the predetermined period.

6. The non-transitory computer-readable storage medium according to claim 1, wherein the process further comprises:

correcting a position of the damaged part based on displacement of feature points included in the plurality of past captured images, captured within a predetermined period, at different times.

7. An image processing method executed by a computer, the image processing method comprising:
   identifying a damaged part of a structure included in a captured image by analyzing the captured image;
   specifying a first partial area including the damaged part in the captured image; and
   specifying a second partial area corresponding to the partial area in each of a plurality of past captured images captured before the captured image; and
   generating a plurality of compressed images corresponding to the plurality of past captured images by compressing an image area in each of the plurality of past captured images without compressing the second partial area.

8. An image processing apparatus comprising:
a memory; and
a processor coupled to the memory and the processor configured to execute a process, the process including:
   identifying a damaged part of a structure included in a captured image by analyzing the captured image;
   specifying a first partial area including the damaged part in the captured image; and
   specifying a second partial area corresponding to the partial area in each of a plurality of past captured images captured before the captured image; and
   generating a plurality of compressed images corresponding to the plurality of past captured images by compressing an image area in each of the plurality of past captured images without compressing the second partial area.

* * * * *